United States Patent [19]

Summerland

[11] Patent Number: 6,060,857

[45] Date of Patent: May 9, 2000

[54] STEPPER MOTOR CONTROLLER

[75] Inventor: David Thomas Summerland, Old Dalby, United Kingdom

[73] Assignee: Mad Lighting Limited, Leicester, United Kingdom

[21] Appl. No.: 09/208,669

[22] Filed: Dec. 10, 1998

[30] Foreign Application Priority Data

Dec. 12, 1997 [GB] United Kingdom .................. 9726226

[51] Int. Cl.⁷ ...................................................... H02P 8/00
[52] U.S. Cl. ............................................................ 318/696
[58] Field of Search ................................... 318/685, 696, 318/254, 700, 701

[56] References Cited

U.S. PATENT DOCUMENTS

| | | | |
|---|---|---|---|
| 4,091,316 | 5/1978 | Friedman ................................ | 318/696 |
| 4,446,411 | 5/1984 | Song ...................................... | 318/696 |
| 4,574,228 | 3/1986 | Blue et al. ............................. | 318/696 |
| 4,647,829 | 3/1987 | Giguere et al. ........................ | 318/696 |
| 4,740,737 | 4/1988 | Schiavon ............................... | 318/696 |
| 4,906,910 | 3/1990 | Tanuma et al. ........................ | 318/696 |
| 5,485,070 | 1/1996 | Tominaga .............................. | 318/696 |

FOREIGN PATENT DOCUMENTS

| | | |
|---|---|---|
| 1465114 | 2/1977 | United Kingdom . |
| 2038117A | 7/1980 | United Kingdom . |
| 1600051 | 10/1981 | United Kingdom . |
| 165107A | 4/1986 | United Kingdom . |
| 194693A | 3/1988 | United Kingdom . |
| 83/02695 | 8/1983 | WIPO . |

*Primary Examiner*—Bentsu Ro
*Attorney, Agent, or Firm*—Young Law Firm, P.C.

[57] ABSTRACT

A controller 20 for a stepper motor 10 comprises a plurality of outputs 26 for supplying drive signals to coils 16 of the stepper motor 10, pulse generating means for supplying full step signals each comprising a succession of digital pulses to each of the outputs 26, pulse width modulation means for supplying a pulse width modulated signal comprising a succession of width modulated digital pulses and mixing means 24 for mixing the full step signals and the pulse width modulated signal to produce digital stepper motor drive signals.

7 Claims, 5 Drawing Sheets

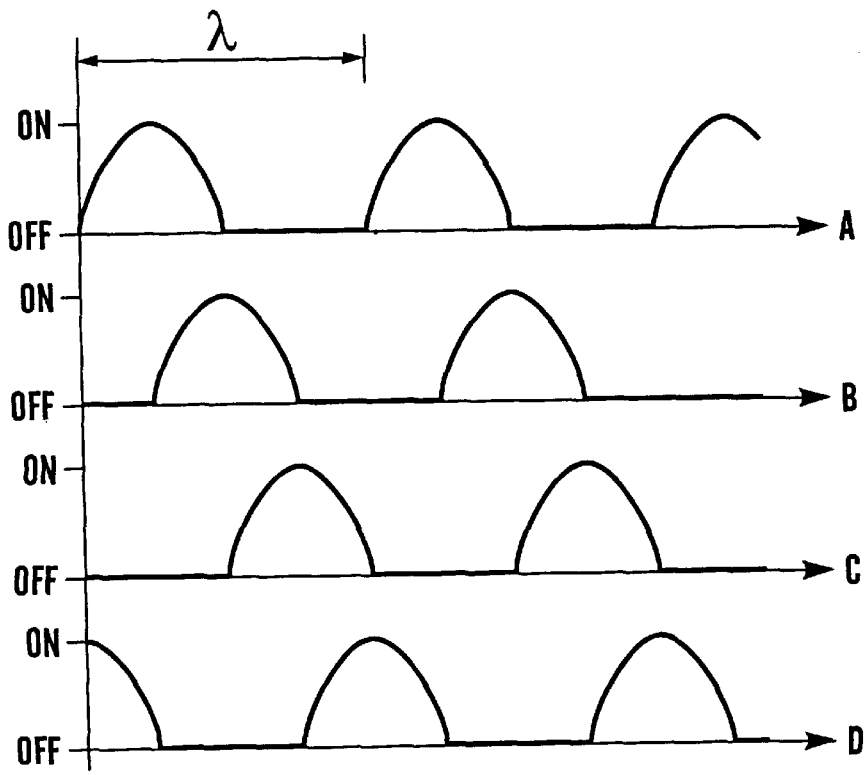
Fig.3 *(Prior Art)*
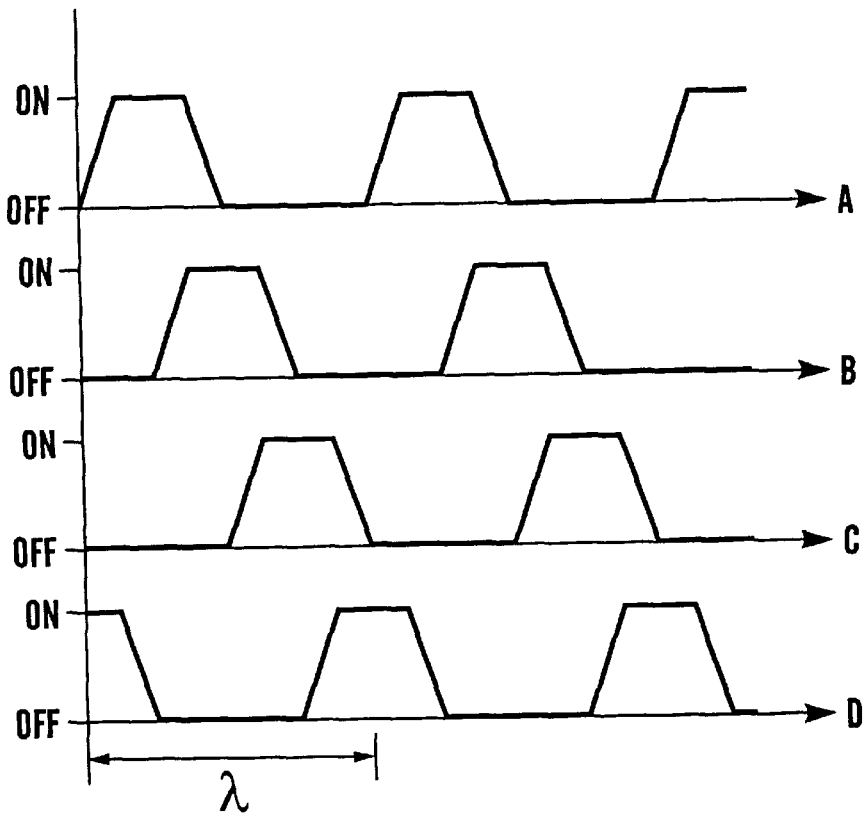
Fig.5

STEPPER MOTOR CONTROLLER

BACKGROUND OF THE INVENTION

1. Field of the Invention

This invention relates to a stepper motor controller, particularly, but not exclusively, to a stepper motor controller for use in a lighting unit for producing decorative effects.

2. Description of the Related Art

Stepper motors are commonly used in applications where the angular position of an object is to be indexed with a high degree of accuracy. An exemplary stepper motor is illustrated schematically in FIG. 1 appended hereto. The motor 10 has a magnetized rotor 12 housed in a stator 14 comprising an array of coils 16. The rotor 12 is mounted to rotate in the stator 14.

The coils 16 of the stator 14 are organised into sets in the stators schematically illustrated in FIG. 1 as two centrally tapped coils. The central taps of the coils are connected in common to ground, thereby rendering the coils effectively four independent sets 16A, 16B, 16C, 16D, which can be energized progressively to urge the rotor into rotating. In particular, the coils of the rotor 12 are energised by means of four input lines 18A, 18B, 18C, 18D. The input lines 18A, 18B, 18C, 18D are connected to a stepper controller (not shown) which applies suitable signals to the input lines 18A, 18B, 18C, 18D so as to set up rotation of the rotor 12.

In a conventional stepper controller, the energizing input signals are square waves, the square waves being shifted in phase relative to each other to establish a progressive energising of the coils 16 of the stator. A typical set of waveforms, for application to each of the input lines 18A, 18B, 18C, 18D, is illustrated in FIG. 2 appended hereto. In FIG. 2, the period labelled λ is one cycle of the driver signals to the motor.

The waveforms as illustrated are relatively straightforward to produce, either by digital electronics or by a software controlled driver. However, they are disadvantageous in that they comprise a series of sharp edges which constitute discontinuities. That leads to rather discontinuous and jerky motion of the rotor. Moreover, the resolution of the motor is limited, in that the angular position of the rotor can only be selected to the nearest half step of the motor.

In order to overcome the problem, a controller has been built which applies signals of selected shape to the input lines 18A, 18B, 18C, 18D. The signals are constructed by pulse width modulation (PWM).

The four input lines 18A, 18B, 18C, 18D each have applied thereto an individually constructed waveform. The waveform consists of a series of pulses, each pulse being a positive half of a sinusoid. The controller as described requires four PWM drivers, or two bipolar PWM drivers, in order to construct the array of input signals. An exemplary set of signals is illustrated in FIG. 3 of the appended drawings. In FIG. 3, the period labelled λ is one cycle of the driver signals to the motor.

SUMMARY OF THE INVENTION

It is an object of the present invention to provide improvements to the foregoing examples from the art, and to ameliorate problems with the foregoing which will become apparent from the description of the invention.

According to a first aspect of the invention, there is provided a controller for a stepper motor, comprising a plurality of outputs for supplying drive signals to coils of a stepper motor, pulse generating means for supplying full step signals each comprising a succession of digital pulses to each of the outputs, PWM means for supplying a PWM signal comprising a succession of width modulated digital pulses, and mixing means for mixing the full step signals and the pulse width modulated signal to produce digital stepper motor drive signals.

Whereas the controller as described with reference to FIG. 3 requires four PWM drives, or two bipolar PWM drivers, in order to construct the array of input signals, the present invention allows a stepper motor controller comprising only one PWM driver to exhibit microstepping, which reduces jerkiness of the motor, since much of the signal generated on each output can be constructed by simple pulse generation, with only those parts of the signal which contribute to jerky motion and lack of resolution being modified by PWM.

Preferably, the mixing means comprises switching means. In a preferred embodiment, there is provided a plurality of switching means, each output having respective switching means associated therewith. Each switching means may be controllable by means of a control input.

The succession of width modulated pulses may comprise successive series of pulses, with each series comprising pulses of a particular width, and the pulses in each series are of either a greater or lesser width than the pulses in the preceding series. There may be, for instance, sixty four series of pulses although any suitable number may be chosen. The pulses may be produced with a period frequency of 15 KHz or greater although, again, any suitable high frequency may be chosen in order to be silent. Frequencies this high are very expensive with analogue solutions.

Further preferably, the invention provides a method of controlling a stepper motor, comprising providing fill step signals each comprising a succession of digital pulses, providing a pulse width modulated signal comprising a succession of width modulated digital pulses, and mixing the full step signals and the pulse width modulated signal to produce stepper motor drive signals.

BRIEF DESCRIPTION OF THE DRAWINGS

Further aspects of the invention will be apparent from the following description of a specific and preferred embodiment of the invention illustrated in the drawings appended hereto, in which:

FIG. 3 shows a graph representing signals input to the coils of the motor illustrated in FIG. 1, in accordance with a second motor controller of known type as described above;

FIG. 5 shows a schematic representative diagram of signals produced by the motor controller illustrated in FIG. 4;

DESCRIPTION OF THE INVENTION

Figure 1:
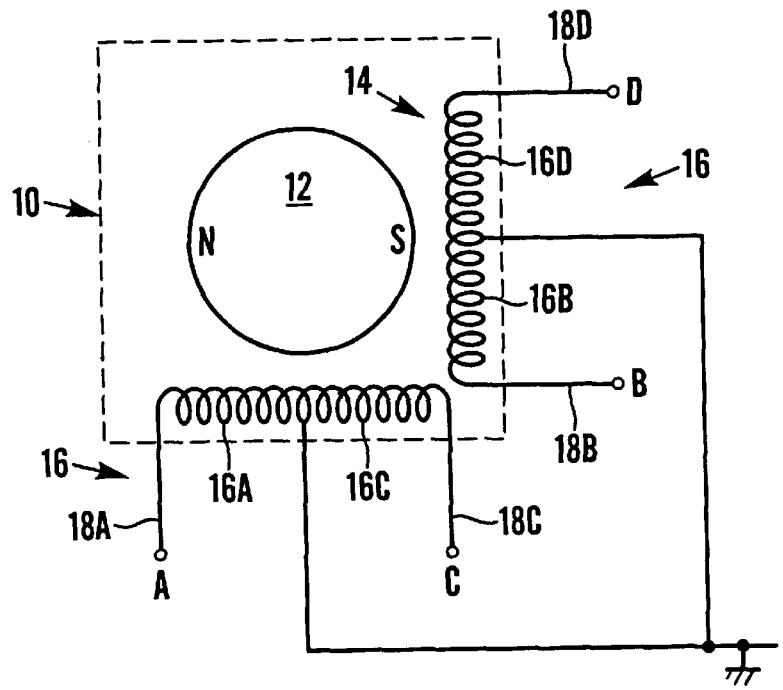
FIG. 1 shows a schematic drawing of a stepper motor of known type, and as described above.
Figure 2:
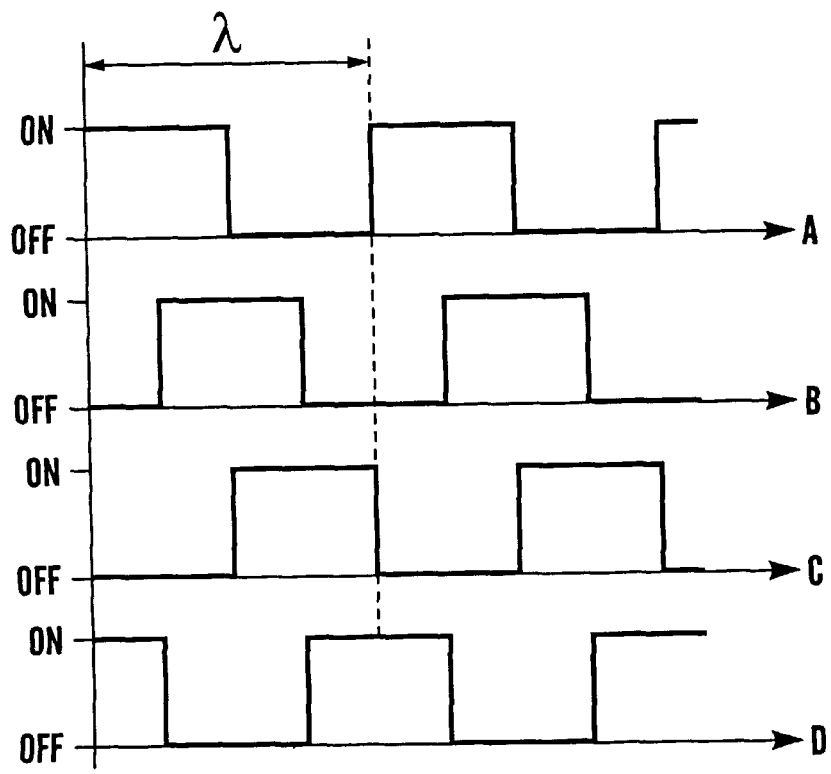
FIG. 2 shows a graph representing signals input to the coils of the motor illustrated in FIG. 1, in accordance with a first motor controller of known type as described above.
Figure 4:
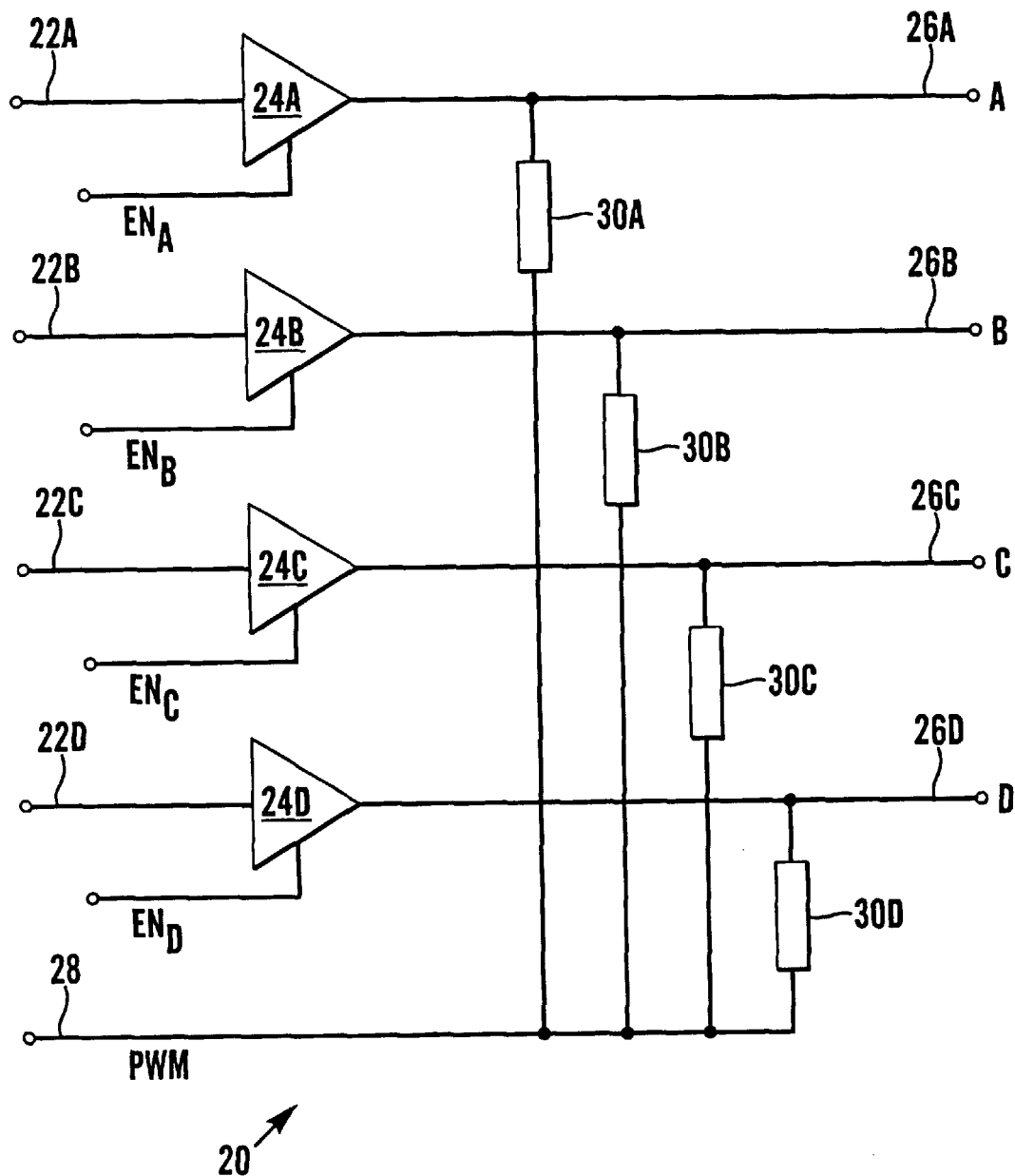
FIG. 4 shows a schematic diagram of a specific motor controller in accordance with the present invention.
Figure 6:
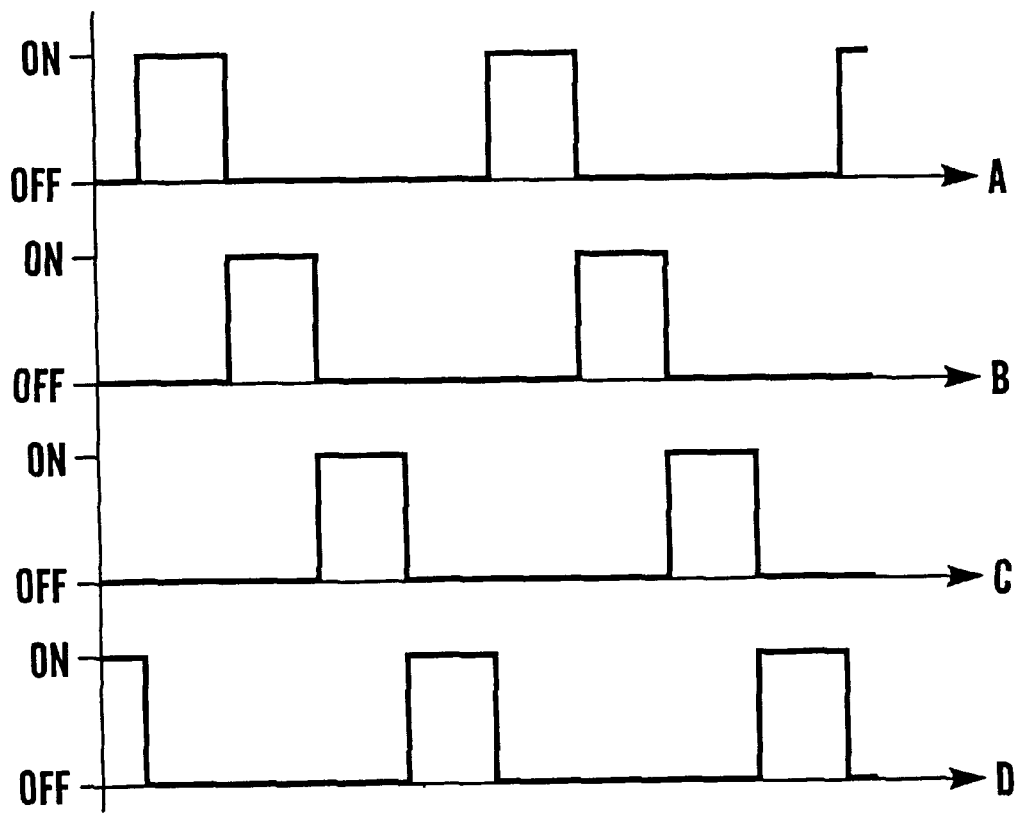
FIG. 6 shows a schematic diagram of stepper motor full step signals.

A stepper motor controller 20 in accordance with the invention arid as illustrated in FIG. 4 appended hereto comprises four signal inputs 22A, 22B, 22C, 22D, each of which is connected to a driver suitable for producing full step signals each comprising a succession of digital pulses. In fact, suitable successions of pulses are illustrated in FIG. 6, a negative going edge of the signal applied to signal input 22A being coincident with a positive going edge on signal input 22B, and similarly for the other signal inputs. It will be readily understood that a driver (not shown) for producing the signals illustrated in FIG. 6 can be constructed from simple sequential logic components.

Each of the four signal inputs 22A, 22B, 22C, 22D, leads to a respective tristate buffer 24A, 24B, 24C, 24D. Each tristate buffer 24A, 24B, 24C, 24D has an enable line ENA, ENB, ENC, END, and an output line 26A, 26B, 26C, 26D, the output lines being connected, in use, to the coil inputs of a stepper motor via a power driving component, such as a transistor (not shown).

A further input 28 to the controller 20 is connected to each of the output lines 26A, 26B, 26C, 26D, via four resistors 30A, 30B, 30C, 30D. The input 28 has a PWM driver (not shown) connected thereto.

In use the state of the buffers 24A, 24B, 24C, 24D is controllable by digital input to the enable lines ENA, ENB, ENC, END. In one state, each buffer 24A, 24B, 24C, 24D is operative to allow the passage of the signal on its signal input 22A, 22B, 22C, 22D to its output line 26A, 26B, 26C, 26D. In the other state, known as the tristate, the buffer is operative such that the output has substantially infinite impedance.

In the circumstances of the illustrated arrangement, when a particular buffer 24A, 24B, 24C, 24D is in tristate, a signal input on the further input 28 can be superimposed on the respective output line 26A, 26B, 26C, 26D.

Figure 7:
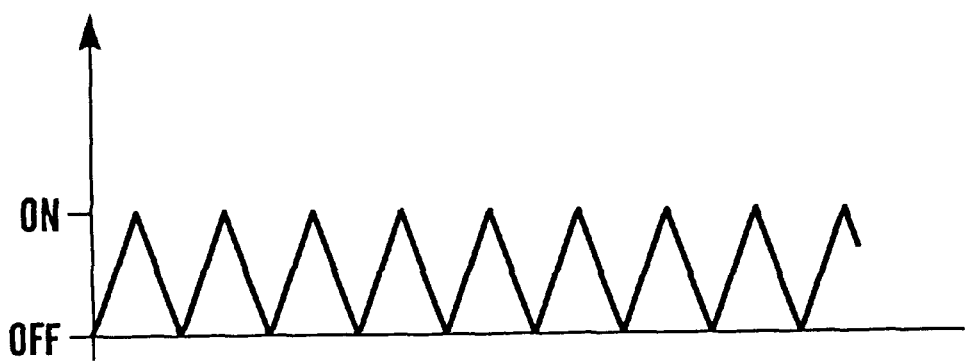
FIG. 7 shows a schematic representative diagram of average voltage variations resulting from a pulse width modulated signal.

FIG. 7 illustrates an approximate representation of the variation in average voltage with time applied on the further input 28. The ramping of the average voltage up and down in the manner illustrated is actually achieved by applying successive series of pulses of gradually increasing width (ramping up) and then successive series of pulses of gradually decreasing width (ramping down), namely a PWM signal. The width of the pulse is the duration for which the pulse is at maximum voltage. There is also a space associated with the pulse, that is, the duration for which there is no voltage, and the width of the pulse and the width of the space always add up to the same duration or period. Thus, the average voltage over the period is a measure of the ratio of the pulse width to the space width: Successive pulses of increasing width means an average voltage which gradually increases and vice versa.

Rather than the voltage on each output line 26A, 26B, 26C, 26D changing virtually instantaneously, by mixing the signal input on inputs 22A, 22B, 22C, 22D with the PWM signal applied on line 28, an element of ramping can be introduced into the voltage change, so as to construct a stepper motor driver signal of the form shown in FIG. 5, although it will be appreciated that the ramping as illustrated is representative of the variation in average voltage with time and not a measure of analogue voltage.

Figure 8:
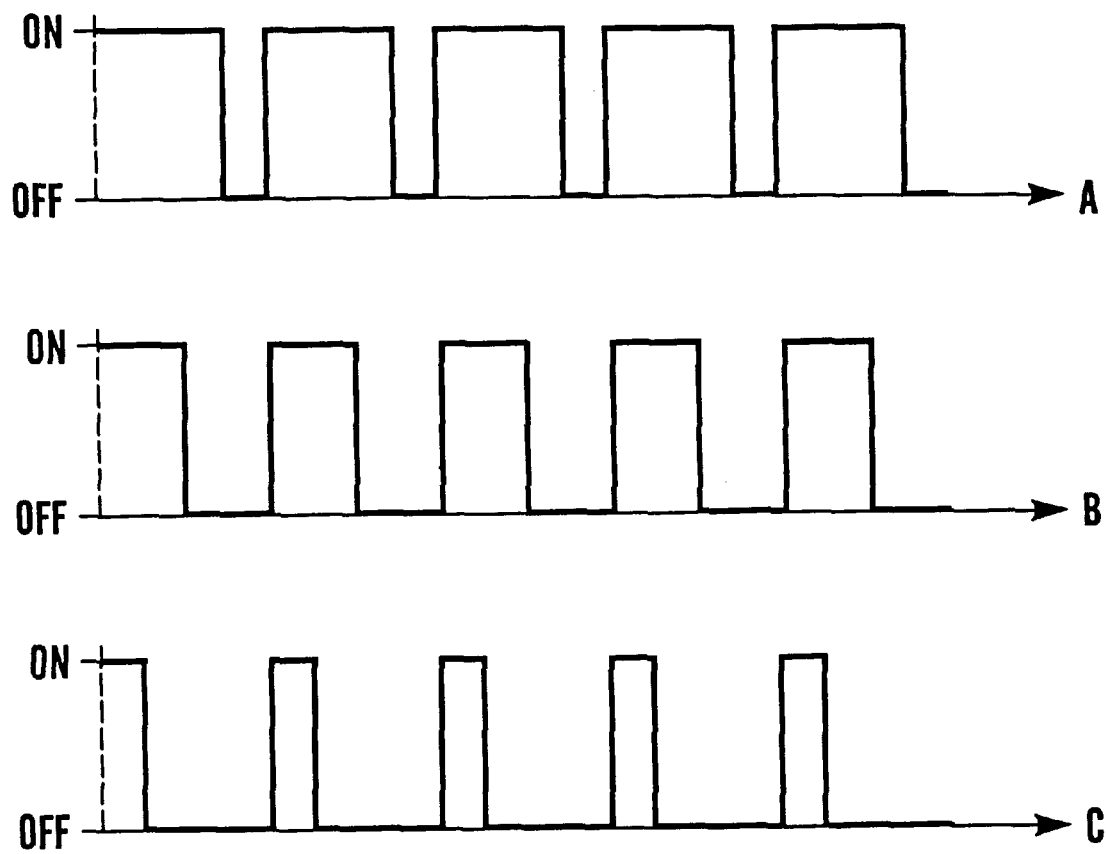
FIG. 8 shows a schematic diagram of successive width modulated pulses used in a controller according to the invention.

The nature of the PWM signal applied on line 28 is in fact as shown in FIG. 8. This is a sample of three series of the pulses involved in the signal as the pulse width is decreasing from A to C. What actually happens is that series of pulses are successively produced, and each series (sixty four in all) comprises a number of pulses of a particular width. The PWM signal has a period frequency of greater than 15 KHz. The PWM signal is mixed with the full step signal so as to smooth the transition of the voltage applied to any motor winding from off to fully on or vice versa. In effect, the average voltage applied to any motor winding charges from fully on to fully off or vice versa in sixty four steps. This avoids jerky motion of the motor, and makes for quiet running and microstepping.

Mixing the signals is achieved by rendering the buffers 24A, 24B, 24C, 24D tri-state at the appropriate time, that is, by software control of the enable lines ENA, ENB, ENC, END. Hence it can be seen that the drive signal to each coil of the stepper motor can be constructed through only one PWM driver, This is extremely advantageous in terms of achieving silent smooth drive with both low size and cost.

I claim:

1. A controller for a stepper motor, comprising a plurality of outputs for supplying drive signals to coils of a stepper motor, pulse generating means for supplying full step signals each comprising a succession of digital pulses to each of the outputs, pulse width modulation means for supplying a pulse width modulated signal comprising a succession of width modulated digital pulses, and mixing means for mixing the full step signals and the pulse width modulated signal to produce digital stepper motor drive signals.

2. A controller according to claim 1 wherein the mixing means comprises switching means.

3. A controller according to claim 2, comprising a plurality of switching means, each output having respective switching means associated therewith.

4. A controller according to claim 3 wherein each switching means may be controllable by means of a control input.

5. A controller according to claim 1 wherein the succession of width modulated digital pulses comprises successive series of pulses, with each series comprising pulses of a particular width, and the pulses in each series are of either a greater or lesser width than the pulses in the preceding series.

6. A controller according to claim 5 wherein the succession of width modulated digital pulses comprises sixty four successive series of pulses.

7. A method of controlling a stepper motor, comprising providing full step signals each comprising successions of digital pulses, providing a pulse width modulated signal comprising a succession of width modulated digital pulses, and mixing the fill step signals and the pulse width modulated signal to produce stepper motor drive signals.

* * * * *